US007305699B2

(12) United States Patent
Crinon et al.

(10) Patent No.: US 7,305,699 B2
(45) Date of Patent: Dec. 4, 2007

(54) METHOD AND APPARATUS FOR GENERATING CAROUSELS

(75) Inventors: Regis J. Crinon, Camas, WA (US); James C. Stanley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1165 days.

(21) Appl. No.: 09/895,734

(22) Filed: Jun. 29, 2001

(65) Prior Publication Data
US 2003/0001901 A1 Jan. 2, 2003

(51) Int. Cl.
*H04N 7/16* (2006.01)

(52) U.S. Cl. ............... 725/136; 725/109; 725/132; 725/139; 370/468; 370/538

(58) Field of Classification Search ............ 725/9, 725/14, 48–51, 109–113, 131, 132, 136, 139–142, 725/152; 370/230–235, 468, 442–3, 535–40, 370/545; 348/385.1, 423, 552–553
See application file for complete search history.

(56) References Cited

U.S. PATENT DOCUMENTS

| | | | |
|---|---|---|---|
| 5,010,553 A | 4/1991 | Scheller et al. | |
| 5,619,274 A | 4/1997 | Roop et al. | |
| 5,731,839 A | 3/1998 | Panaro | |
| 5,805,825 A | 9/1998 | Danneels et al. | |
| 6,031,577 A | 2/2000 | Ozkan et al. | |
| 6,047,317 A * | 4/2000 | Bisdikian et al. | 725/142 |
| 6,057,882 A | 5/2000 | Van Den Branden Lambrecht et al. | |
| 6,130,898 A | 10/2000 | Kostreski et al. | |
| 6,137,549 A * | 10/2000 | Rasson et al. | 725/37 |
| 6,148,081 A | 11/2000 | Szymanski et al. | |
| 6,177,930 B1 | 1/2001 | Chernock et al. | |
| 6,222,530 B1 * | 4/2001 | Sequeira | 715/500.1 |
| 6,317,885 B1 | 11/2001 | Fries | |
| 6,490,722 B1 | 12/2002 | Barton et al. | |
| 6,574,795 B1 * | 6/2003 | Carr | 725/71 |
| 6,678,855 B1 | 1/2004 | Gemmell | |
| 6,782,006 B1 * | 8/2004 | Tanaka et al. | 370/468 |
| 6,895,595 B2 * | 5/2005 | Goodman et al. | 725/136 |

OTHER PUBLICATIONS

Kreyszig, Erwin, "Advanced Engineering Mathematics", 1999, John Wiley & Sons, Inc, 8th ED, pp. 1137-1140.*

* cited by examiner

Primary Examiner—Annan Q Shang

(57) ABSTRACT

An apparatus for generating one or more carousels. A carousel includes a plurality of modules, at least one of which exhibits multiple instances, that are arranged in a module schedule. The apparatus may create, through multiple iterations, two or more module schedules for a carousel, and the optimum module schedule may then be selected and implemented on the carousel.

28 Claims, 12 Drawing Sheets

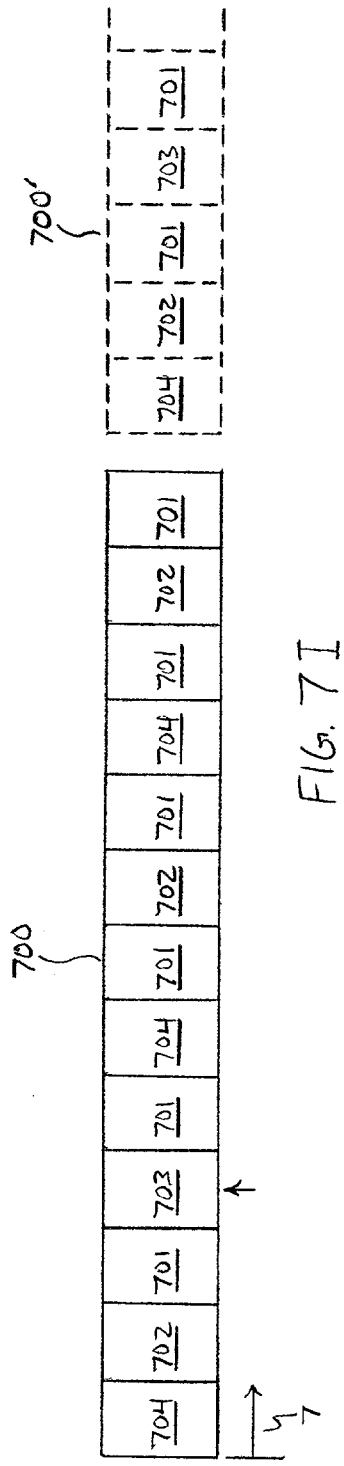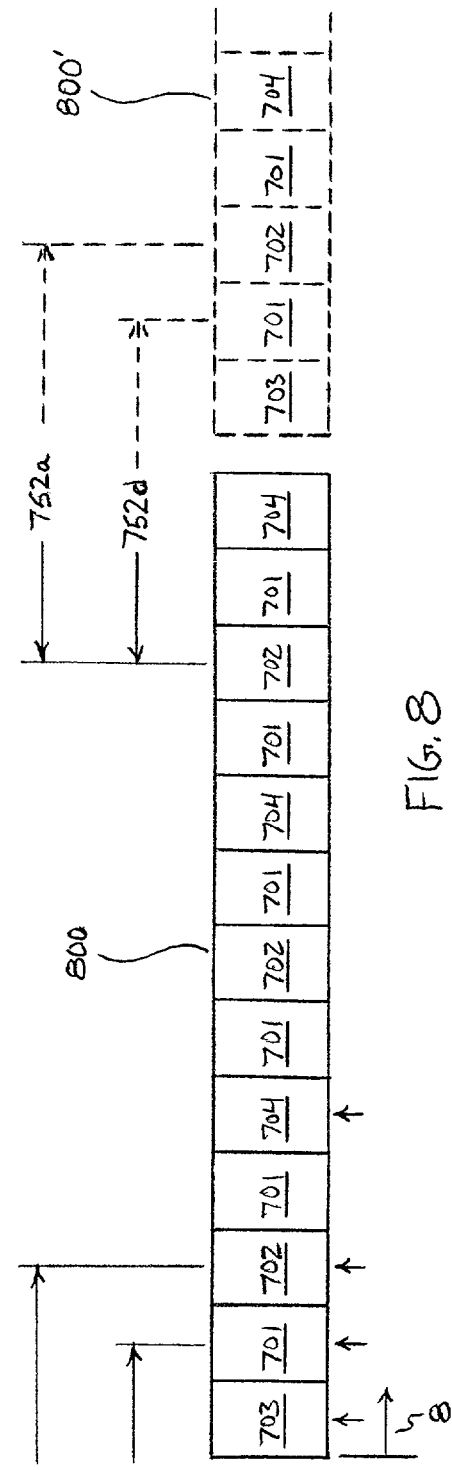

| MODULE | INSTANCE | DESIRED INTERVAL | ACTUAL INTERVAL | INTDIFF | RESULT | PENALTY | SUM |
|---|---|---|---|---|---|---|---|
| 701 | 1st | 2 | 3 | 1 | 0.3 | 0 | 0.3 |
| 701 | 2nd | 2 | 2 | 0 | 0 | 0 | 0.3 |
| 701 | 3rd | 2 | 2 | 0 | 0 | 0 | 0.3 |
| 701 | 4th | 2 | 2 | 0 | 0 | 0 | 0.3 |
| 701 | 5th | 2 | 2 | 0 | 0 | 0 | 0.3 |
| 701 | 6th | 2 | 2 | 0 | 0 | 0 | 0.3 |
| 702 | 1st | 4 | 3 | -1 | 0.3 | 0 | 0.6 |
| 702 | 2nd | 4 | 6 | 2 | 0.7 | 0 | 1.3 |
| 702 | 3rd | 4 | 4 | 0 | 0 | 0 | 1.3 |
| 703 | 1st | 13 | 13 | 0 | 0 | 0 | 1.3 |
| 704 | 1st | 4 | 5 | 1 | 0.3 | 0 | 1.6 |
| 704 | 2nd | 4 | 4 | 0 | 0 | 0 | 1.6 |
| 704 | 3rd | 4 | 4 | 0 | 0 | 0 | 1.6 |

FIG. 10

| MODULE | INSTANCE | DESIRED INTERVAL | ACTUAL INTERVAL | INTDIFF | RESULT | PENALTY | SUM |
|---|---|---|---|---|---|---|---|
| 701 | 1st | 2 | 3 | 1 | 0.3 | 0 | 0.3 |
| 701 | 2nd | 2 | 2 | 0 | 0 | 0 | 0.3 |
| 701 | 3rd | 2 | 2 | 0 | 0 | 0 | 0.3 |
| 701 | 4th | 2 | 2 | 0 | 0 | 0 | 0.3 |
| 701 | 5th | 2 | 2 | 0 | 0 | 0 | 0.3 |
| 701 | 6th | 2 | 2 | 0 | 0 | 0 | 0.3 |
| 702 | 1st | 4 | 5 | 1 | 0.3 | 0 | 0.6 |
| 702 | 2nd | 4 | 4 | 0 | 0 | 0 | 0.6 |
| 702 | 3rd | 4 | 4 | 0 | 0 | 0 | 0.6 |
| 703 | 1st | 13 | 13 | 0 | 0 | 0 | 0.6 |
| 704 | 1st | 4 | 5 | 1 | 0.3 | 0 | 0.9 |
| 704 | 2nd | 4 | 4 | 0 | 0 | 0 | 0.9 |
| 704 | 3rd | 4 | 4 | 0 | 0 | 0 | 0.9 |

FIG. 11

| MODULE | INSTANCE | DESIRED INTERVAL | ACTUAL INTERVAL | INTDIFF | RESULT | PENALTY | SUM |
|---|---|---|---|---|---|---|---|
| 701 | 1st | 2 | 3 | 1 | 0.3 | 0 | 0.3 |
| 701 | 2nd | 2 | 1 | -1 | 0.3 | 5.0 | 5.6 |
| 701 | 3rd | 2 | 2 | 0 | 0 | 0 | 5.6 |
| 701 | 4th | 2 | 2 | 0 | 0 | 0 | 5.6 |
| 701 | 5th | 2 | 3 | 1 | 0.3 | 0 | 5.9 |
| 701 | 6th | 2 | 2 | 0 | 0 | 0 | 5.9 |
| 702 | 1st | 4 | 4 | 0 | 0 | 0 | 5.9 |
| 702 | 2nd | 4 | 4 | 0 | 0 | 0 | 5.9 |
| 702 | 3rd | 4 | 5 | 1 | 0.3 | 0 | 6.2 |
| 703 | 1st | 13 | 13 | 0 | 0 | 0 | 6.2 |
| 704 | 1st | 4 | 5 | 1 | 0.3 | 0 | 6.5 |
| 704 | 2nd | 4 | 5 | 1 | 0.3 | 0 | 6.8 |
| 704 | 3rd | 4 | 3 | -1 | 0.3 | 0 | 7.1 |

1310  1320  1330  1340  1350  1360  1370  1380  1385

METHOD AND APPARATUS FOR GENERATING CAROUSELS

RELATED APPLICATIONS

This application is related to application Ser. No. 09/895,448, entitled "Carousel Exhibiting Multiple Occurrences of a Module", filed concurrently herewith; application Ser. No. 09/895,347, entitled "Method of Measuring Goodness of a Module Schedule for a Carousel", filed concurrently herewith; and application Ser. No. 09/895,113, entitled "Method of Scheduling Modules on a Carousel", also filed concurrently herewith.

FIELD OF THE INVENTION

The invention relates generally to digital communications and, more particularly, to the transmission of information using data or object carousels.

BACKGROUND OF THE INVENTION

In recent years, there has been widespread growth in the development and use of digital communication methods and systems, such growth being exemplified by the advent of digital television broadcasting, the proliferation of wireless telephones, and the prevalence of electronic mail and computer networking, especially the Internet. Moving in step with this expansion of digital communication, has been the demand for increased bandwidth to accommodate the transmission of digitized multimedia information (e.g., images, audio, video). The available bandwidth provided by conventional transmission systems is, however, limited. Accordingly, compression techniques are commonly employed to reduce the bandwidth necessary to transmit multimedia content.

One of the most common and widely adopted family of standards for compression of video signals is known as MPEG-2, developed by the Motion Pictures Expert Group. See, e.g., International Organization for Standardization/International Electrotechnical Commission (ISO/IEC) 13818-1, *Information Technology—Generic Coding of Moving Pictures and Associated Audio Information: Systems*; and ISO/IEC 13818-2, *Information Technology—Generic Coding of Moving Pictures and Associated Audio: Video*. The MPEG-2 standards have received widespread acceptance in the digital television industry. For example, MPEG-2 had been adopted by the Advanced Television System Committee, or ATSC (United States), by Digital Video Broadcasting, or DVB (Europe), by the Association of Radio Industries and Business, or ARIB (Japan), and by the Society of Cable Telecommunications Engineers (SCTE).

Of particular interest in the digital multimedia environment is the transmission of data that has been multiplexed into an MPEG-2 transport stream that already includes the packets of video and audio elementary streams pertaining to, for example, a digital television programming event. The MPEG-2 standards also define a set of tools, known as Digital Storage Media—Command and Control (DSM-CC), for performing such data transmission, as well as other functions. See ISO/IEC 13818-6, *Information Technology—Generic Coding of Moving Pictures and Associated Audio Information-Part 6: Extensions for DSM-CC*.

The DSM-CC specification defines protocols for both data and object carousels. A data carousel comprises a series of data modules that are transmitted in an MPEG-2 transport stream in a periodic manner. Similarly, an object carousel includes a set of object modules that are transmitted periodically, an object module comprising data exhibiting a hierarchical structure (e.g., directories and files) that can be reconstructed at the receiving end of the MPEG-2 transmission. More specifically, an object module is a data module conveying one or several individual objects referred to as BIOP (Broadcast Inter-ORB Protocol) objects, as defined in the DSM-CC specification. An individual BIOP object may represent a file, a directory, a service gateway, or a stream object. As used herein, the term "object module" refers to a data module including one or more such BIOP objects, or an equivalent thereof.

There are a number of potential uses for data and object carousels. By way of example, a data or object carousel may be used for the transmission of electronic program guide information—including title, channel, time, as well as show information—within an MPEG-2 digital television signal. Similarly, data and object carousels may be used to transmit advertising or product information to television viewers. Other potential applications include the transmission of emergency information, books, movies, weather forecasts, news, and music. Data and object carousels; may be used in both simplex transmission systems and duplex transmission systems (i.e., having a return channel for interactivity). Further, data and object carousels may be applied to unicast transmissions (i.e., point-to-point), multicast transmissions (i.e., one to a specified group), and broadcast transmissions (i.e., one to all or an unspecified number).

Despite the utility of data and object carousels and their potential for use in the expanding digital television market, as well as in other multimedia applications, conventional implementations of data and object carousels have proven unsatisfactory for a number of reasons. For example, conventional data and object carousels do not provide adequate tuneability, do not provide prioritization for modules containing critical information, and provide minimal compensation for data corruption or transmission errors.

A broadcaster does not know when any particular subscriber or viewer will tune to a particular channel and, therefore, can not tailor a carousel to any specific viewer or group of viewers. Thus, a broadcaster can not commence transmission of a carousel in response to any particular viewer tuning to a channel. Further, the broadcaster can not transmit to a first viewer tuning to a channel a carousel having a set of data or object modules arranged in a particular order and then transmit to a second viewer tuning to the channel at some later point in time a carousel having a different arrangement of the data or object modules.

In sum, the broadcaster simply has no knowledge of viewer behavior and can not insure that a high priority data or object module will be available immediately after a viewer tunes into a particular channel. As a result, a viewer tuning to a channel mid-way through the transmission period of a carousel will not be able to receive those data or object modules transmitted prior to tuning into that channel, and the viewer must wait at least the remainder of the carousel period to receive any missed module. Conventional data and object carousels do not, therefore, provide those receiving the carousel with the ability to tune to the channel on which the carousel is being transmitted and, with minimal or no delay, receive a desired or critical module within the carousel. Thus, conventional data and object carousel do not provide efficiency of acquisition or, in other words, these carousels lack tuneability.

Within a data or object carousel, certain of the modules making up that carousel may contain critical information, and it may be desirable to insure that one or more of these critical modules is received immediately upon tuning to the channel on which the carousel is being transmitted, or shortly thereafter. A critical data or object module may, by way of example, comprise a module including files or instructions necessary for rendering data contained in other modules within the carousel (e.g., a media plug-in). However, conventional data and object carousels are not susceptible to prioritization. Although it is possible to arrange the modules within a data or object carousel such that any high priority modules are, for example, placed at or near the beginning of the carousel's period, it is not possible to insure the high priority modules are received first because, as noted above, a broadcaster does not know a priori when a viewer will tune to a particular channel.

Conventional data and object carousels also fail to provide adequate compensation for data corruption or transmission error. If a data or object module becomes corrupted during transmission, that module is not available to the receiving entity for at least the period of the carousel (i.e., the time required for that module to be repeated during the subsequent transmission of the carousel). Loss of a module due to transmission errors or data corruption can be especially problematic for high priority modules, as loss of the critical data or object module may impede use of other modules on the carousel.

BRIEF DESCRIPTION OF THE DRAWINGS

FIGS. 7A-I show schematically an exemplary embodiment of the method of creating a data or object carousel illustrated in FIG. 6.

FIG. 8 shows a schematic diagram of another exemplary embodiment of a data or object carousel created according to the method of FIG. 6.

FIG. 10 is a table depicting the method of FIG. 9, as applied to the data or object carousel of FIG. 7I.

FIG. 11 is a table depicting the method of FIG. 9, as applied to the data or object carousel of FIG. 8.

DETAILED DESCRIPTION OF THE INVENTION

Figure 1:
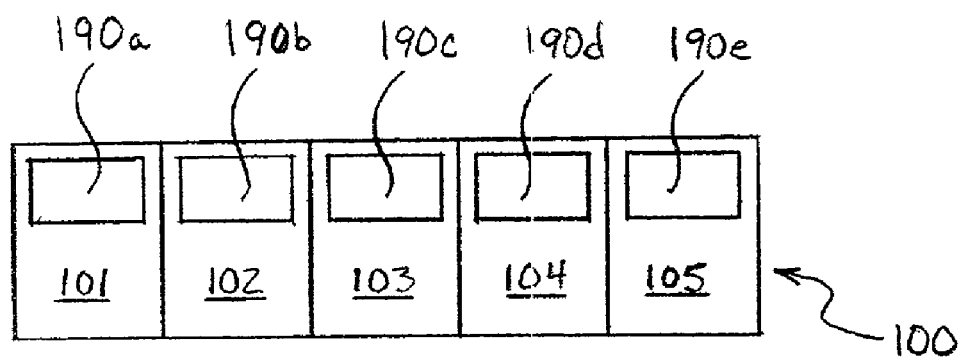
FIG. 1 shows a schematic diagram of a conventional data or object carousel.

Referring to FIG. 1, a conventional data or object carousel 100 includes a plurality of data or object modules 101, 102, 103, 104, 105. Each of the data or object modules 101, 102, 103, 104, 105 contains module content 190a, 190b, 190c, 190d, 190e, respectively. The module content 190a-e of each module 101, 102, 103, 104, 105 may comprise one or more data files or a combination of data files and one or more directory files. Each data or object module 101, 102, 103, 104, 105 has only one occurrence, or instance, within the data or object carousel 100. As noted above, such a data or object carousel 100—exhibiting only a single instance of each data or object module 101, 102, 103, 104, 105 on the carousel—does not provide tuneability, prioritization of modules containing critical information, or compensation for data corruption and/or transmission errors.

Shown in FIGS. 2 through 15 are embodiments of a data or object carousel exhibiting multiple occurrences of one or more data or object modules. Also illustrated in FIGS. 2 through 15 are embodiments of a method and apparatus for creating such data or object carousels, as well as for measuring the "goodness" of these data or object carousels with respect to one or more pre-defined metrics. For convenience and ease of understanding, the following detailed description is presented in the context of a data carousel and associated data modules. However, it should be understood by those of ordinary skill in the art that the present invention is not so limited and, further, that the present invention is equally applicable to an object carousel and associated object modules, as well as to a carousel having a combination of both data and object modules.

Figure 2:
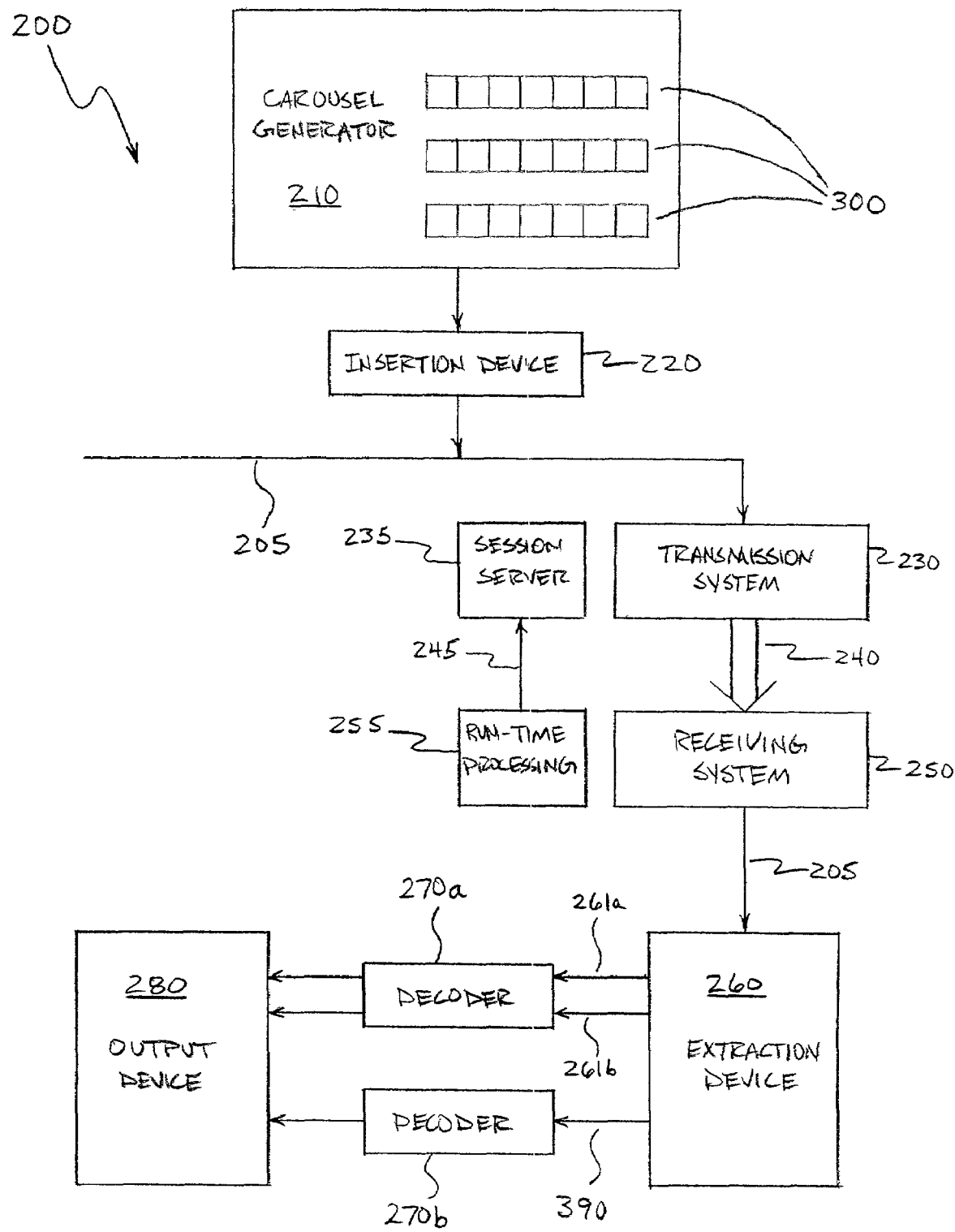
FIG. 2 shows a schematic diagram of a communications apparatus incorporating an embodiment of a data carousel generator.

Referring to FIG. 2, a communications apparatus 200 includes a carousel generator 210 for generating one or more data carousels 300, each data carousel 300 containing, if necessary, multiple instances of at least one data module. The carousel generator 210 is coupled to an insertion device 220. Insertion device 220 receives a data carousel 300—or, alternatively, two or more different data carousels 300—from the carousel generator 210 and encapsulates, packetizes, and multiplexes the data carousel(s) 300 within a communications signal, such as the MPIEG-2 transport stream 205 shown in FIG. 2. Generally, the data carousel 300 (or each of multiple different data carousels) is encapsulated into the transport stream 205 in a cyclical manner, such that a data carousel 300 is transmitted and received periodically. For example, a data carousel 300 may be repeatedly transmitted throughout the duration of a television program or event with which that carousel 300 is associated.

The MPEG-2 transport stream 205 comprises one or more streams of MPEG-2 transport packets (e.g., video and/or audio packets) that have been multiplexed to form an MPEG-2 transport stream. The MPEG-2 transport stream 205 may represent, for example, a digital television broadcast signal or an encoded transmission propagating over a computer network. An MPEG-2 television signal may include a plurality of channels, each channel represented by streams of audio and video packets multiplexed into the MPEG-2 transport stream 205. A data carousel 300 may be associated with one, all, or a selected portion of the television channels carried on MPEG-2 transport stream 205. Further, two or more different data carousels 30C may be associated with a single television channel (or a plurality of channels). It should also be understood that a television channel carried in MPEG-2 transport stream 205 may represent only the information carried in a data carousel 300 or a plurality of different data carousels 300. In other words, one or more data carousels 300 may comprise a stand-alone television channel.

The MPEG-2 transport stream 205 is fed to a transmission system 230, which receives the MPEG-2 transport stream 205, performs any necessary processing or signal conditioning (e.g., adding parity bits representing Forward Error Correction information), and then transmits the resulting MPEG-2 transport stream 205 including encapsulated data carousel 300 over transmission media 240 to a receiving system 250. The transmission system 230 may perform analog-to-digital conversion, modulation, and/or encryption.

The transmission media 240 may comprise electrical cables (e.g., coaxial cable), fiber optics, or electromagnetic waves (e.g., for radio, line-of-sight microwave, and satellite transmissions). Alternatively, the transmission media 240 may comprise a combination of two or more of the above-referenced transmission media. For example, transmission media 240 may comprise a combination of fiber optic cable and coaxial cable—i.e., Hybrid Fiber-Coax (HFC). The receiving system 250 receives the MPEG-2 transport stream 205 and performs any necessary processing or signal conditioning. For example, the receiving system 250 may perform demodulation, demultiplexing, decryption, and/or channel tuning. The receiving system 250 outputs the MPEG-2 transport stream 205 (or, more generally, the transport steam associated with a selected channel) to an extraction device 260.

The extraction device 260 includes circuit and/or logic adapted to demultiplex the module content 390 (e.g., data files) carried in data carousel 300 from MPEG-2 transport stream 205 and to reconstruct the module content 390. The extraction device 260 outputs MPEG-2 elementary streams—e.g., video elementary stream 261*a* and audio elementary stream 261*b*—and module content 390 to an output device 280 or, alternatively, to separate output devices. The MPEG-2 elementary streams 261*a*, 261*b* are routed to a decoder 270*a* for decoding and/or decompression prior to being received at the output device 280. Herein, the decoder 270*a* is a combined representation of a video decoder and an audio decoder; this is done for the sake of clarity, although these decoders are typically very different in how they operate. Also, the MPEG-2 elementary streams 261*a*, 261*b* may undergo digital-to-analog conversion prior to entering, or within, the output device 280. Similarly, the module content 390 may also be routed to a data decoder 270*b* for decoding and/or decompression and may also undergo digital-to-analog conversion.

Output device 280 allows for a user to access both the module content 390 and the information (e.g., video and audio packets) carried within MPEG-2 transport stream 205. For example, the output device 280 may comprise a television, or a portion thereof (e.g., the view screen), in which case the MPEG-2 transport stream 205 represents a digital television signal including one or more channels. A viewer can tune to a selected channel carried by MPEG-2 transport stream 205 to watch a television program while also accessing—either simultaneously with the television program (e.g., picture-in-picture) or in lieu thereof—the module content 390. The module content, which may be displayed automatically or only at request of the viewer, may represent program information, advertising, news, or other desired information. Also, the module content 390 may be associated with a stand-alone television channel, as noted above.

Data and object carousels may also be applied to interactive environments, such as, by way of example, interactive television. Interactivity may be facilitated by, for example, an interactive session server 235 located at the head end (see FIG. 2) coupled via a return path or channel 245 to a run-time processing environment 255 located at the receiving end. The run-time processing environment 255, in conjunction with the interactive session server 235 enables a viewer or user to respond to data received from a data carousel 300 and to send requests and/or commands back to the session server. Such an interactive environment may be useful for advertising and/or home shopping applications, as well as others.

The insertion device 220, transmission system 230, transmission media 240, receiving system 250, extraction device 260, decoders; 270*a-b*, and output device 280 are intended to represent exemplary embodiments of these devices or systems, respectively, such components being well known in the art. Accordingly, the present invention should not be limited by reference to the specific embodiments of the insertion device 220, transmission system 230, transmission media 240, receiving system 250, extraction device 260, decoders 270*a-b*, and output device 280 described herein, as those of ordinary skill in the art will understand that each of these components may comprise any suitable one of such component known in the art.

Also, it should be understood that some of the devices and systems of the communications apparatus 200 may, in practice, comprise a single apparatus. By way of example, the receiving system 250, extraction device 260, and decoders 270*a-b* may comprise part of a "cable box" or part of a satellite receiver, the output device 280 comprising a television coupled thereto. Similarly, the receiving system 250, extraction device 260, decoders 270*a-b* (which may comprise a single decoder), and output device 280 may all comprise part of a television, whether digital or analog, or part of a computer system.

Figure 3:
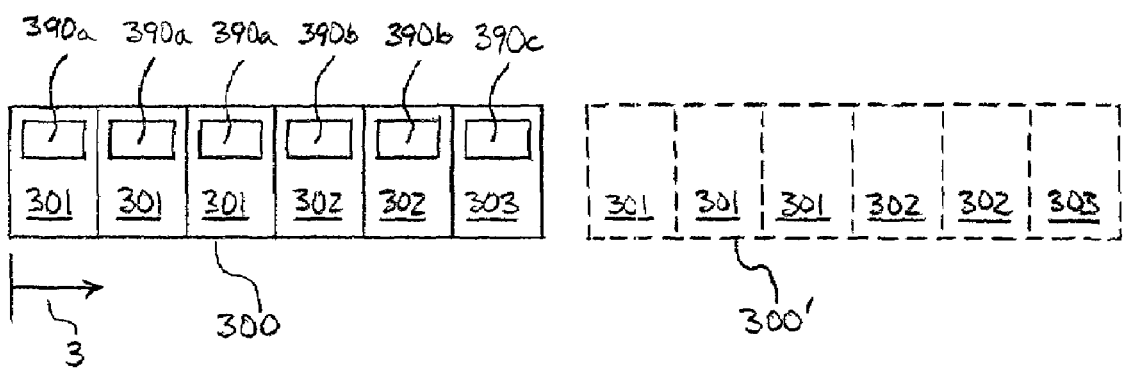
FIG. 3 shows a schematic diagram of an exemplary embodiment of a data or object carousel having multiple occurrences of a data or object module.

With reference to FIG. 3, data carousel 300 includes a plurality of data modules 301, 302, and 303, the data module 301 having three occurrences or instances, the data module 302 having two instances, and the data module 303 having one instance. Each of the data modules 301, 302, 303 includes module content 390*a*, 390*b*, 390*c*, respectively, such as data files (or data files and directory files). As noted above, a data or object carousel is generally transmitted periodically. In FIG. 3, the subsequent periodic transmission of the data carousel 300 is denoted as 300' (shown in dashed line). The horizontal axis 3 denotes time, indicating that carousel period 300' is transmitted after carousel period 300.

The data carousel 300—having multiple instances of a data module (e.g., 301, 302)—provides a number of advantages. Data carousel 300 allows for prioritization of data modules within the carousel. For example, a critical data module may be assigned the greatest number of occurrences (e.g., data module 301) and a low priority data modules assigned a low number of occurrences (e.g., data module 303, which has only one instance). Prioritization of modules within a carousel provides enhanced access to critical data. Also, multiple instances of one or more data modules within a data carousel provides improved tuneability. A television viewer tuning into a channel on which the data carousel 300 is being periodically transmitted will have an increased likelihood of receiving the data module 301, as that data module has three instances within the carousel 300. Thus, if the viewer tunes to the channel carrying the data carousel 300 after the second instance of the data module 301, the viewer will still capture data module 301 during that module's third occurrence. Compensation for transmission errors and/or data corruption is an additional feature of the data carousel 300. If, for example, the first two instances of data module 301 are corrupted during transmission, a viewer may capture the third instance of data module 301.

Although the data carousel 300 having multiple instances of a data module provides the above-noted advantages, the data carousel 300 is not optimal in its design. The data modules 301, as well as data modules 302, are arranged successively within the period of the carousel (i.e., they are grouped together). If a television viewer, for example, tunes to the channel carrying data carousel 300 at some point after transmission of the third instance of data module 301, the viewer must wait the remainder of the carousel period to capture the module content 390a of data module 301. Such a delay in receiving the data module 301 may be especially problematic if the data module 301 contains critical data. Thus, an arrangement of the data carousel 300 in which the multiple occurrences of a data module are spaced apart would provide even greater tuneability.

Not only may data modules be grouped together within a single period of a data carousel, as illustrated in FIG. 3, the instances of a data module may also be grouped together across successive periods of a data carousel. For example, referring to FIG. 4, a data carousel 400 includes data modules 401, 402, 403, each having module content 490a, 490b, 490c, respectively. Data module 401 has three instances, data module 402 has two instances, while data module 403 has only a single instance. A subsequent period of the data carousel 400 is shown in dashed line and is denoted as 400'. The horizontal axis 4, which denotes time, indicates that the carousel period 400' is transmitted after carousel period 400. Within a period of the data carousel 400, none of the data modules 401, 402, 403 exhibit successive occurrences (i.e., no instance of a data module is placed adjacent an instance of a like data module). However, observing the data carousel 400 across multiple periods (e.g., 400 and 400'), the data carousel 400 exhibits successive occurrences of the data module 401.

Figure 4:
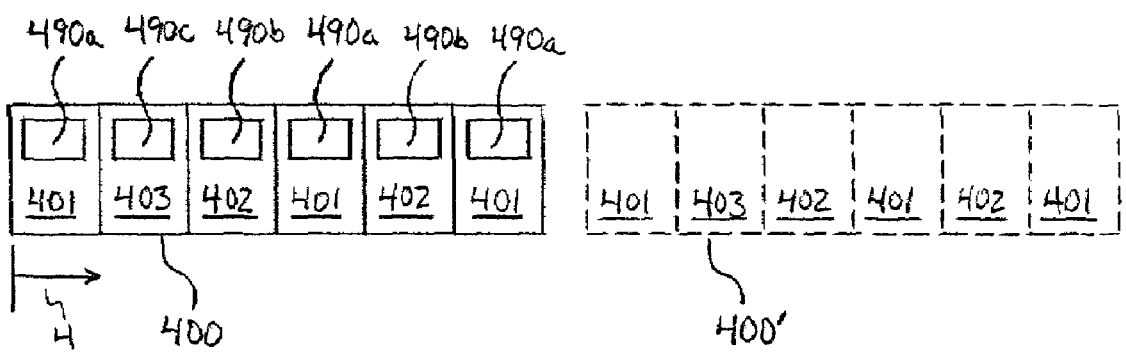
FIG. 4 shows a schematic diagram of another exemplary embodiment of a data or object carousel having multiple occurrences of a data or object module.
Figure 5:
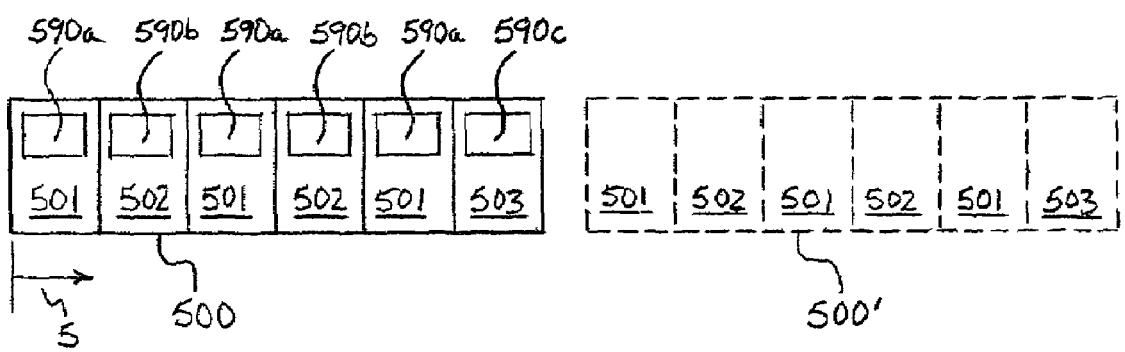
FIG. 5 shows a schematic diagram of a further exemplary embodiment of a data or object carousel having multiple occurrences of a data or object module.

FIG. 5 shows a data carousel 500 having a plurality of data modules 501, 502, 503 arranged, or scheduled, uniformly within the period of the data carousel 500 and across multiple periods—note subsequent period 500' shown in dashed line (and horizontal axis 5, which denotes time)—of the data carousel 500. The data module 501 (having module content 590a) has three instances and may be the highest priority module, the data module 502 (having module content 590b) may be a lower priority module, while the data module 503 (having module content 590c) may be the lowest priority module within carousel 500. By spreading out the occurrences of the higher priority data modules (e.g., 501, 502), these more frequently occurring data modules are more readily available to a receiver coming online or tuning into the proper channel at some intermediate point during the carousel's period of transmission. Therefore, as illustrated in FIGS. 3 through 5, the efficiency of acquisition of module content (i.e., tuneability) can be maximized not only through multiple instances of higher priority modules, but also through proper scheduling of the modules within al carousel.

That the tuneability of a data carousel having multiple occurrences of a data module is dependent upon the sequence of modules within the carousel period leads to the notion that a module schedule may be created that provides optimum accessibility of high priority modules. There are a number of criterion that may suggest the most efficient sequence of modules within a carousel period. As noted above, simply increasing the instances of high priority data modules will provide more efficient and robust transmission of critical module content. Also, the instances of a data module should be spread—as uniformly and as far apart as possible—within a carousel's period and across successive repetitions of carousel periods. A further criterion follows from the preceding: transmitting two like data modules in succession, without a different intervening data module, should be avoided. These criterion, however, point to yet another concern in determining the most efficient sequence of data modules within a carousel. All data modules on a carousel must be scheduled according to the same criterion; thus, scheduling conflicts will occur as data modules "compete" for positions, or slots, within the carousel period. This scheduling conflict may be most acute when there are two or more data modules with the same number of instances—i.e., having the same, or nearly the same, priority.

Figure 6:
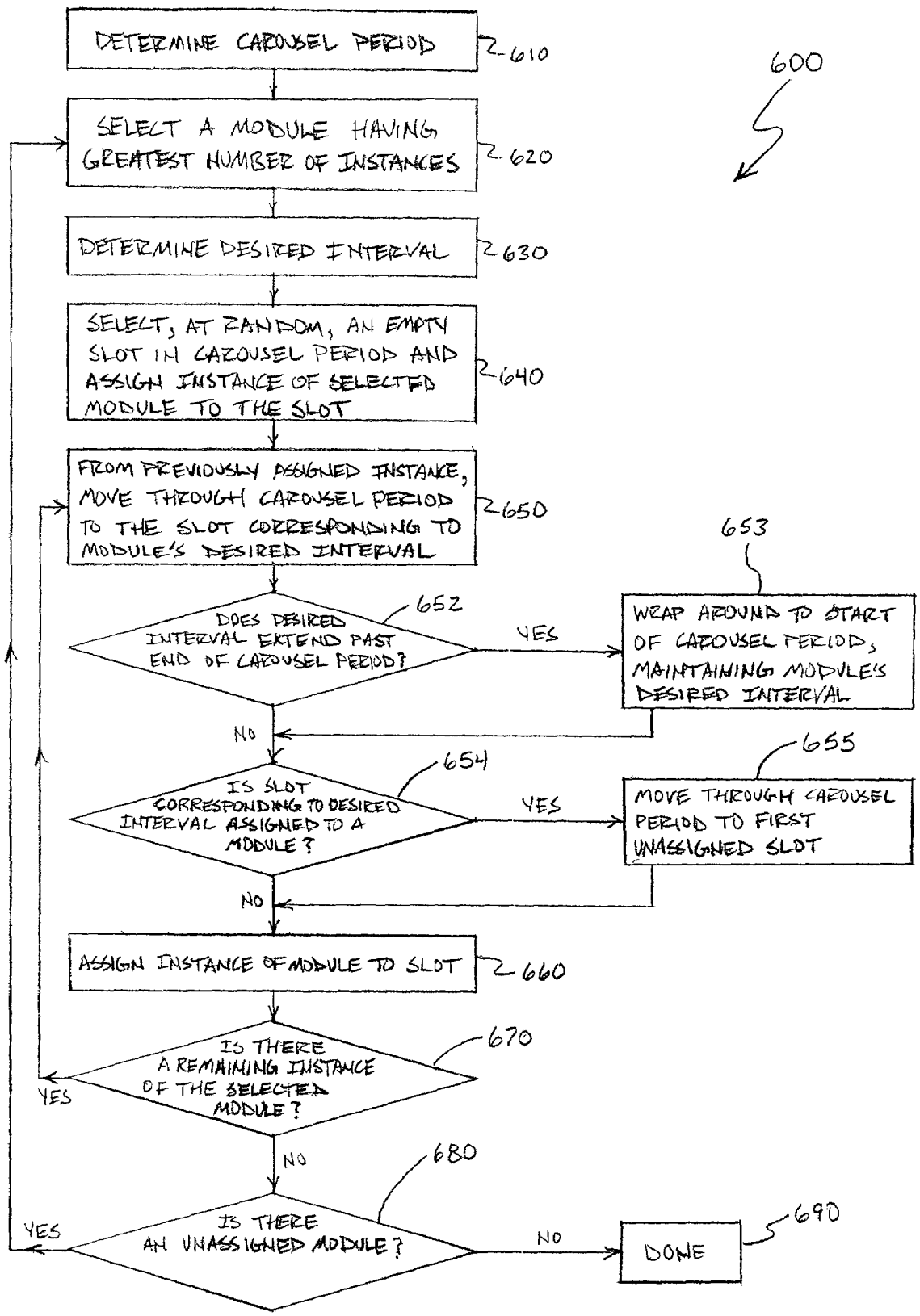
FIG. 6 is a flow chart depicting an embodiment of a method of creating a data or object carousel having multiple occurrences of a data or object module.

Referring now to FIG. 6, an embodiment of a method 600 of scheduling data modules within a data carousel is shown in flow chart format. The following description of the scheduling method 600 is further illustrated in the context of an exemplary implementation of the scheduling method 600 shown in FIGS. 7A-I, which should be referenced in conjunction with FIG. 6. The method 600 of scheduling data modules will generate a sequence—or a number of sequences from which the most desirable may be selected—of data modules providing efficient acquisition and robust data transmission (e.g., compensating for transmission errors and/or data corruption).

Figure 7A:
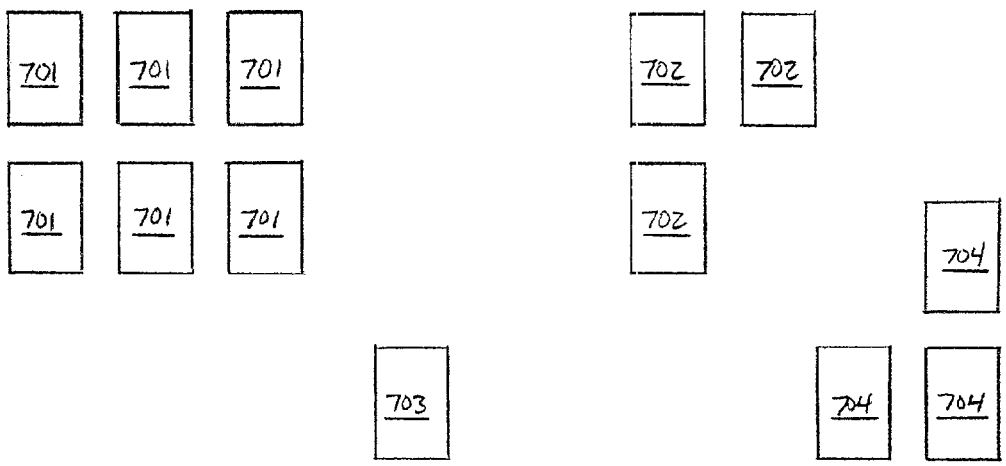
Figure 7B:
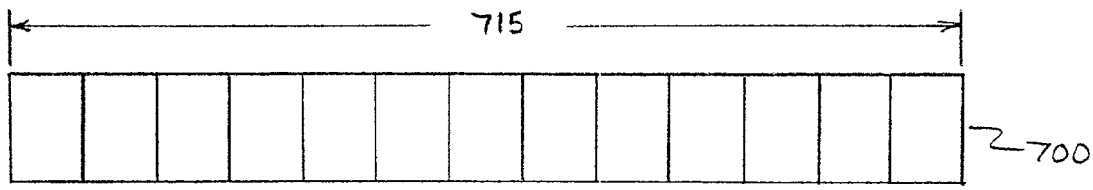

The method 600 may begin with determining the carousel period 610. The carousel period is the sum of all module instances. Referring to FIG. 7A, a set of data modules includes six instances of a data module 701, three instances of a data module 702, one instance of a data module 703, and three instances of a data module 704. The sum of all the instances of data modules 701, 702, 703, 704 is thirteen; therefore, as illustrated in FIG. 7B, a data carousel 700 for transmitting the data modules 701, 702, 703, 704 has a period 715 of thirteen. Accordingly, there are thirteen "empty" slots into which the data modules 701, 702, 703, 704 are to be scheduled.

A data module having the greatest number of instances is then selected for scheduling 620. If there are two or more data modules with the same number of occurrences, any of these data modules may be selected at random. Alternatively, rather than making a random selection, criterion may be employed. For example, if one of the two or more data modules having the same number of instances is believed to have a higher priority, that higher priority data module may be selected first for scheduling. Referring to FIG. 7A, the data module 701 has the greatest number of instances.

For the selected data module 701, the desired interval of that module must be determined 630. The desired interval is the ideal distance between instances of a data module within a carousel's period. The desired interval of a data module is determined by dividing the carousel period by the number of instances of that data module. If the calculated interval is not a whole number, the desired interval is taken as the largest integer that is less than or equal to the calculated interval. Alternatively, the calculated interval may simply be rounded to the nearest whole number to determine the desired interval. The data module 701, therefore, has a desired interval of two.

Figure 7C:
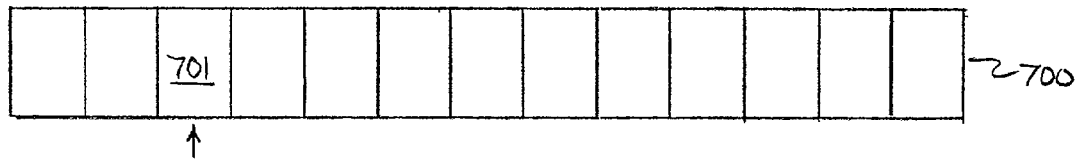

Select, at random, an empty or unassigned slot within the carousel period, and assign that slot to an instance of the selected module, as denoted at 640. Referring to FIG. 7C, a random slot (marked by an arrow) is selected and assigned to one instance of data module 701. There will always be an available slot within the period, as the period corresponds to the sum of the instances of all modules, It should be understood that the first instance of a module to be scheduled need not necessarily be assigned to a slot at random. For example, the first instance of the first scheduled module may always be assigned to the slot at the beginning of a period, the first instance of the second scheduled module always assigned to the available slot nearest the beginning of the period, the first instance of the third scheduled module always assigned to the next available slot nearest the beginning of the period, and so on.

Figure 7D:
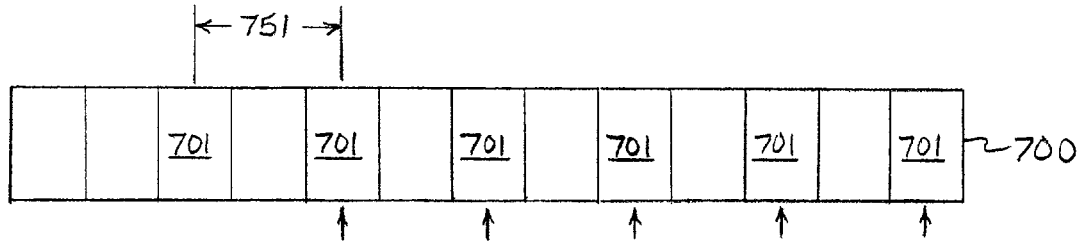

From the previously assigned slot, move through the carousel period to the slot corresponding to the selected module's desired interval (i.e., two for data module 701), which is denoted at 650. If the desired interval extends past the end of the carousel period, wrap around to the start of the carousel period, maintaining the module's desired interval (see FIG. 6, items 652, 653). Assign the slot corresponding to the module's desired interval to an instance of the selected module, as denoted at 660. If, however, the slot corresponding to the desired interval is already assigned to a data module, move through the carousel period to the first unassigned slot (see FIG. 6, items 654, 655), and assign that slot to an instance of the selected module. Referring to FIG. 7D, a data module 701 is assigned to a slot (marked with an arrow) corresponding to the desired interval of module 701, the desired interval denoted by numeral 751.

If there is a remaining instance of the selected module, assign that instance to a slot within the carousel using the same procedure (i.e., steps 650, 652, 653, 654, 655, 660), which is denoted at 670. Referring again to FIG, 7D, the remaining instances of data module 701 are each assigned to a slot (marked with arrows).

If there is a remaining module that has not been scheduled, the scheduling process is repeated (see FIG. 6, item 680). Another module—having the next greatest number of instances—is selected. Referring back to FIG. 7A, data modules 702 and 704 each have three instances; therefore, one of these data modules 702, 704 must selected for scheduling. For the example of FIG. 7A, the data module 704 was randomly selected for scheduling. As noted above, if there are two or more modules exhibiting the greatest number of instances, a module may be selected for scheduling based on a set of criteria. For example, although they have the same number of instances, data module 704 may have a higher priority than data module 702. The desired interval for the data module 704—i.e., carousel period/number of instances of data module 704—is four.

Figure 7E:
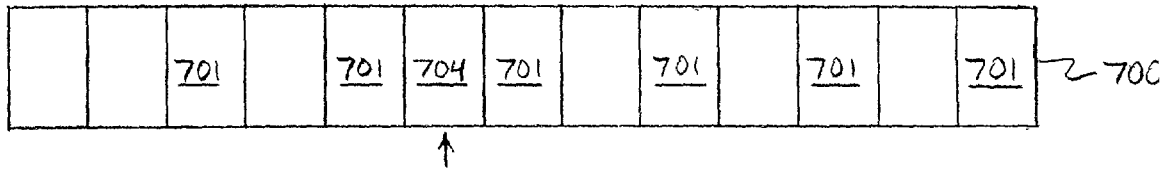
Figure 7F:
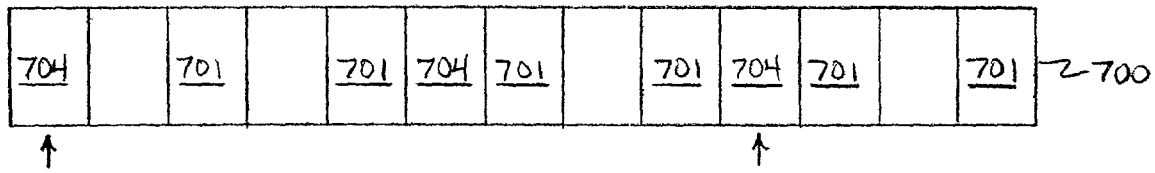

An unassigned slot within the carousel period is then randomly selected and assigned to an instance of the selected module. Referring to FIG. 7E, an unassigned slot (marked with an arrow) is selected and assigned to an instance of data module 704. From this assigned slot, move through the carousel period to the slot corresponding to the module's desired interval and, if the desired interval extends past the end of the carousel period, wrap around to the start of the period while maintaining the module's desired interval. If the slot corresponding to the desired interval is assigned to a module, move through the carousel period to the first available slot. Referring to FIG. 7F, the remaining two instances of the data module 704 are each assigned to a slot (marked with arrows) in this manner. Note that a slot assignment for the third instance of data module 704 is determined by wrapping around to the start of the carousel's period.

Figure 7G:
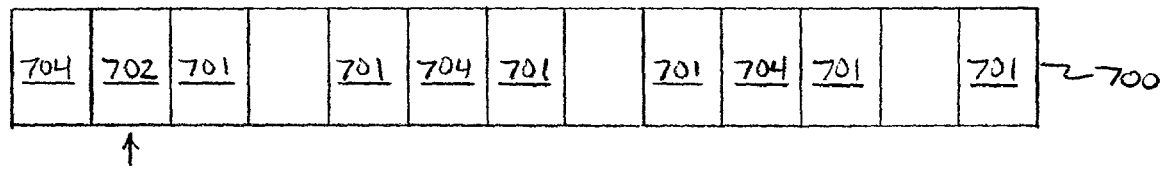
Figure 7H:
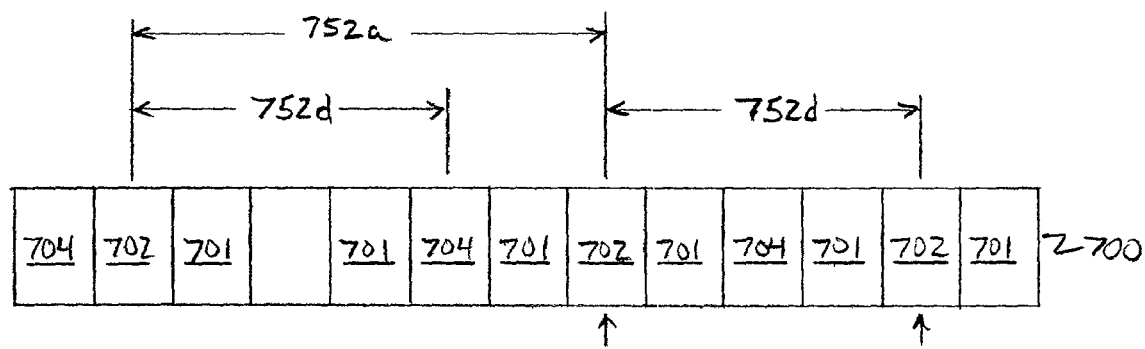

The above-described procedure is then performed for all remaining data modules (i.e., modules 702, 703). Referring to FIG. 7G, an instance of data module 702 (the remaining module having the greatest number of instances) is assigned, at random, to an unassigned slot (marked by arrow) on data carousel 700. With reference to FIG. 7H, each of the remaining two instances of data module 702 are then assigned to a slot by moving through the carousel 700 to the slot corresponding to the module's desired interval (i.e., four). Note that, for the second instance of data module 702, the slot corresponding to the desired interval (denoted by reference numeral 752d) was previously assigned (to a module 704), requiring that the second instance of data module 702 be positioned in the first available slot. The slot assignment for the final instance of data module 702 does, however, correspond to the desired interval 752d.

The only remaining data module—module 703 having one instance—is then assigned to a slot. As noted above, there should always be an open slot within the carousel period, as the carousel period is equal to the sum of all instances of data modules to be scheduled on the carousel. Thus, in this example, there is only one unassigned slot remaining (marked by an arrow), and this slot is assigned to data module 703, as illustrated in FIG. 7I.

Referring to FIG. 7I, it can be observed that the instances of each data module having multiple instances (i.e., 701, 702, 704) are distributed uniformly, or nearly uniformly, throughout the period of data carousel 700. This uniform distribution is maintained not only within the period of carousel 700, but also across successive repetitions of the data carousel 700, the subsequent period of carousel 700 being denoted as 700' (a portion of which is shown in dashed line). A horizontal axis 7 denotes time and indicates that the carousel period 700' is transmitted after the carousel period 700. No data module on data carousel 700—within a single period, or across successive periods 700, 700'—is positioned within carousel 700 next to another like data module without at least one different intervening data module. The data carousel 700, as illustrated in FIG. 7I, presents one example of an optimized schedule for the data modules 701, 702, 703, 704, such an optimized schedule providing module prioritization, efficient data acquisition, and robust transmission.

As illustrated in FIG. 6, some of the scheduling decisions may be made at random. Specifically, the slot to be assigned the first instance of a module may be selected at random and, if there are two or more modules exhibiting the same number of occurrences, the first to be scheduled may be selected at random. Thus, the choices made during these random decisions will affect the outcome of module scheduling method 600 and, accordingly, multiple outcomes exist for application of the scheduling method 600 to a set of modules. This characteristic of the scheduling method 600 can be illustrated by reference to FIG. 8, which shows a data carousel 800 having an alternative schedule for the data modules 701, 702, 703, 704 of FIG. 7A.

The schedule for data carousel 800 was determined using the method 600 of FIG. 6, with the slot randomly selected for the first instance of each data module marked by an arrow. Also, data module 702 was scheduled prior to data module 704. The data carousel 800 also exhibits an optimized module schedule within its period, as well as across successive repetitions of the period, the subsequent period of data carousel 800 being denoted as 800', a portion of which is shown in dashed line (horizontal axis 8 denoting time, thereby indicating that carousel period 800' is transmitted after carousel period 800). It can be observed, however, that the data carousels 700 (see FIG. 7I) and 800 (see FIG. 8) exhibit significantly different module schedules, raising the question of which of the data carousels 700, 800 possesses the most efficient and robust schedule. Thus, in assessing which among many different module schedules—resulting from numerous iterations of scheduling method 600—is the most efficient and robust, it would be useful to obtain a measurement of these properties for each schedule or, in other words, a measurement of the "goodness" of each schedule.

Figure 9:
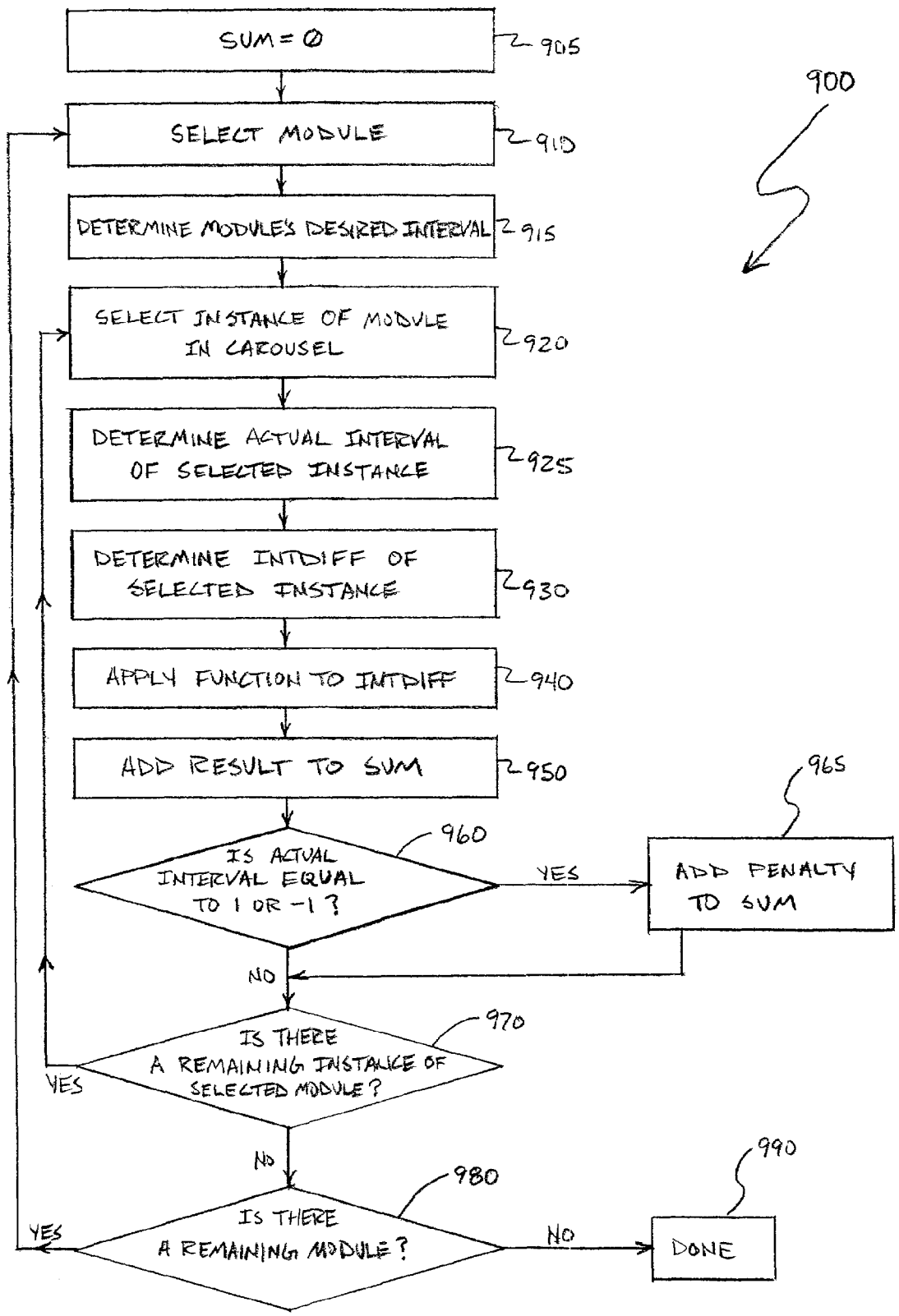
FIG. 9 is a flow chart depicting an embodiment of a method of determining the "goodness" of a data or object carousel.

An embodiment of a method 900 of measuring the goodness of a module schedule is illustrated in FIG. 9 in flow chart format. The method 900 of FIG. 9 is based on the premise that an ideal module schedule is one in which the actual intervals—i.e., the actual number of slots between an instance of a module and that modules prior instance (see FIGS. 7H and 8, item 752*a*)—of a module are all equal to the desired interval (see FIGS. 7H and 8, item 752*d*), as defined above. Scheduling instances of a module close to one another, as well as scheduling instances of the module too far apart, are both undesirable characteristics of a module schedule. Further, as previously suggested, a particularly poor schedule will result if instances of a module are placed adjacent one another within a carousel. Thus, for the method 900 of FIG. 9, the metric used to quantify the goodness of a module schedule is the difference between the actual interval for an instance of a module and that module's desired interval—or the "interval difference"—wherein particular scrutiny (e.g., a penalty) is accorded to like modules positioned directly adjacent one another.

With reference to FIG. 9, a variable—referred to herein simply as "SUM"—is set or cleared to zero 905. A module is selected 910 and the desired interval of the selected module is determined 915. An instance of this module is then selected, as denoted at 920, and the actual interval of the selected instance is determined 925. The difference between the desired interval and the actual interval, or interval difference (INTDIFF), is determined for the selected instance, as denoted at 930.

A function is then applied to the INTDIFF to determine a RESULT, and the RESULT is added to the SUM, as denoted at reference numerals 940 and 950, respectively. Any suitable function may be employed in the method 900 of measuring the goodness of a schedule. The function that is applied may, for example, accentuate small values of INTDIFF while downplaying larger values of INTDIFF, such that smaller values of INTDIFF are not obscured in the final metric, or SUM. Exemplary functions that are believed suitable include:

$$RESULT=(INTDIFF)^2$$

$$RESULT=Log[(INTDIFF)^2+1], \text{ or simply}$$

$$RESULT=Abs(INTDIFF).$$

As noted above, the successive occurrence of two instances of the same module is an undesirable characteristic of a carousel, as the placement of like modules next to one another within a carousel provides minimal contribution to the overall tuneability and robustness of a module schedule. In order to emphasize the existence of adjacent like modules in a schedule and, further, to clearly distinguish those schedules exhibiting adjacent like modules from those schedules, that do not, a penalty term may be added to the SUM for each pair of adjacent like modules. The penalty term may comprise a constant that is large in comparison with other values contributing to the SUM, such that a schedule exhibiting adjacent like modules is clearly differentiated from other module schedules or is disqualified. Alternatively, the penalty term may be non-constant. For example, the penalty term may be a function of the number of adjacent like pairs of modules (e.g., the penalty term increases in magnitude for each additional pair of adjacent like modules). Thus, referring to FIG. 9, if the actual interval for a module instance is equal to 1 (or −1), as denoted at 960, a penalty term is added to the SUM (see reference numeral 965).

If there is a remaining instance of the selected module (FIG. 9, item 970), the above-described procedures for determining the INTDIFF, calculating a RESULT and adding the RESULT to the SUM, as well as assessing a penalty, if necessary, are repeated (see FIG. 9, items 920, 925, 930, 940, 950, 960, 965). Once all instances of the selected module have been processed, the method 900 must be applied to all remaining modules, if any (see FIG. 9, item 980), until the impact of all modules on the metric, or SUM, has been assessed. The final SUM that results after considering all modules in the carousel provides a measure of the goodness of the module schedule. The goodness metric for each of a plurality of different module schedules can then be compared to determine which schedule, or schedules, is optimum and will provide the greatest efficiency of acquisition and the most effective compensation for transmission errors and/or data corruption. Generally, the module schedule having the lowest goodness metric will be the optimum module schedule; however, it should be understood that, depending on the metric(s) employed in the method 900 of measuring goodness, the most optimum module schedule may not correspond to the lowest goodness measurement.

An exemplary implementation of the method 900 of FIG. 9 can be observed with reference to FIGS. 10 and 11. FIG. 10 shows a table 1000 summarizing the method 900 of measuring goodness as applied to the data carousel of FIG. 7I. For every instance of each module (columns 1010, 1020), the desired interval and actual interval are determined (columns 1030, 1040). Based on the desired and actual intervals, the INTDIFF is determined (column 1050) and a function is applied to the INTDIFF to determine a RESULT (column 1060). For the implementation of FIG. 10, as well as FIG. 11, the function is: RESULT=Log[(INTDIFF)$^2$+1]. If necessary, a penalty term is also assessed, as shown in column 1070. A SUM is maintained, as shown in column 1080, with the final total of SUM or measure of goodness 1085 shown at the bottom of column 1080.

Similarly, FIG. 11 shows a table 1100 summarizing the method 900 of measuring goodness as applied to the data carousel of FIG. 8. Again, the desired and actual intervals are determined for each instance of a module (see columns 1110, 1120, 1130, 1140). As shown in columns 1150 and 1160, the INTDIFF is then determined and the function—i.e., RESULT=Log[(INTDIFF)$^2$+1] applied to the INTDIFF. Any penalty term is assessed (column 1170) and the RESULT and penalty added to the SUM (column 1180). All modules instances are considered to determine the measure of goodness 1185. With reference to FIGS. 10 and 11, it can be observed that the data carousel 700 of FIG. 7I exhibits a goodness measurement of 1.6, whereas the data carousel 800 of FIG. 8 exhibits a goodness metric of 0.9. Therefore, the module schedule of data carousel 800 will generally provide greater tuneability and more robust transmission in comparison to the module schedule of data carousel 700. It should be noted that, in FIGS. 10 and 11 (as well as in FIG. 13), the desired interval used in the method 900 could be a decimal number as opposed to an integer number to reflect the true periodicity of the data module in the carousel period (e.g., the true desired interval for data module 701 is 13/6=2.1666 . . . ).

Figures 12, 13:
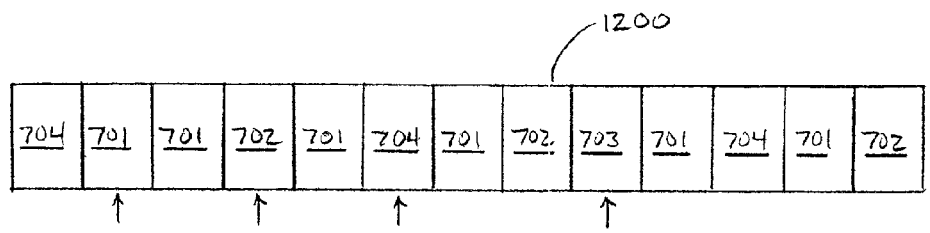
FIG. 12 shows a hypothetical data or object carousel exhibiting successive occurrences of the same data or object module.
FIG. 13 is a table depicting the method of FIG. 9, as applied to the data or object carousel of FIG. 12.

Shown in FIG. 12 is a hypothetical embodiment of a data carousel 1200 that exhibits a pair of adjacent like modules—i.e., the first instance of module 701 (marked by arrow) and the subsequent instance of module 701. FIG. 13 shows a table 1300 summarizing the method 900 of measuring goodness as applied to the data carousel 1200. The function applied in the implementations of FIGS. 10 and 11 was also utilized in the implementation of FIG. 13 and, further, a penalty of 5.0 was assessed for any adjacent like pairs of data modules. Data carousel 1200 exhibits a goodness metric of 7.1 (see FIG. 13, item 1385). Thus, the data carousel 1200 is clearly set apart from the data carousel 700 (goodness metric of 1.6) and the data carousel 800 (goodness metric of 0.9), enabling the module schedule of data carousel 1200 to be easily identified as exhibiting a poorer module schedule relative to other data carousels (e.g., 700, 800) and discarded.

From the foregoing discussion of FIGS. 9 through 13, it should be understood than any suitable combination of a function and penalty term may be utilized in the method 900 of measuring the goodness of a module schedule, so long as the selected function and penalty term provide a metric that differentiates between poor schedules and those schedules providing as least some tuneability and robustness of transmission. It should be further understood that, in addition to the exemplary functions disclosed herein —i.e., RESULT=$(INTDIFF)^2$; RESULT=$Log[(INTDIFF)^2+1]$; and RESULT=$Abs(INTDIFF)$—any other suitable function known in the art may be employed in the method 900 of FIG. 9.

Figure 14:
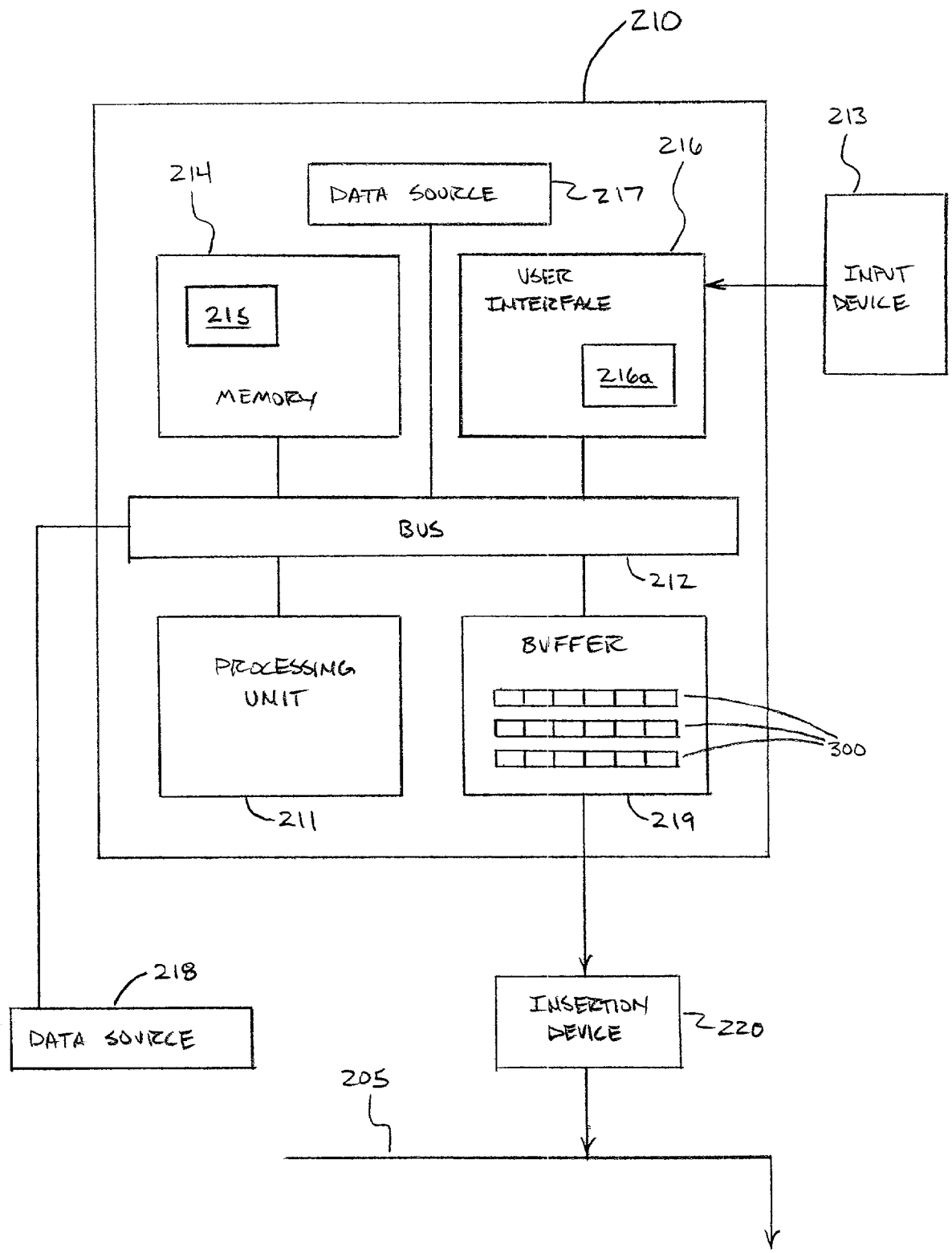
FIG. 14 shows a schematic diagram of one embodiment of a data carousel generator.

An exemplary embodiment of carousel generator 210 (see FIG. 2) is shown in FIG. 14. The carousel generator 210 is capable of generating a module schedule having multiple instances of a data module and, optionally, determining the goodness of a module schedule. Carousel generator 210 includes a processing unit 211 coupled to a bus 212. Processing unit 211 may comprise one or more processors, one or more Application Specific Integrated Circuits (ASICs), or any other suitable circuitry or integrated circuit device(s). A memory 214 is coupled to the processing unit 211 via bus 212, the memory 214 comprising non-volatile memory (e.g., ROM), volatile memory (e.g., DRAM), or any suitable combination thereof.

Resident in memory 214 is application program or code 215. Application program 215 comprises a set of instructions that, when executed in processing unit 211, will schedule a plurality of data modules—at least one of which may include multiple instances—within a carousel period to create one or more data carousels 300. For example, application program 215 may include instructions to implement the method 600 of scheduling modules shown and described with respect to FIG. 6. In a further embodiment, application program 215 also includes instructions to implement the method 900 of measuring the goodness of a module schedule, as shown and described with respect to FIG. 9. It should be understood that all or a portion of the instructions comprising application program 215 may be resident on, or implemented within, processing unit 211 or other suitable circuitry.

As set forth above, during execution of the method 600 of scheduling modules on a carousel, one or more random decisions (e.g., slot assignment for first instance of a module; which of multiple modules exhibiting the same number of instances to schedule first) may be made. Accordingly, the carousel generator 210 may include a pseudo random generator for executing this random decision ranking process. The pseudo random generator may be implemented in software (e.g. application program 215) or, alternatively, in hardware (e.g., processing unit 211 or other circuitry).

The data (or data files and directory files) to be downloaded into a module for scheduling onto a data carousel 300 are downloaded from a data source 218. In an alternative embodiment, at least some (or all) of the data is obtained from an internal (or removable) data source or memory device 217. The internal (or removable) memory source may comprise any suitable memory device, such as a hard disk drive, CD ROM drive, or floppy disk drive. An assembled data carousel (or carousels) 300 may, in a further embodiment, be stored in a buffer memory device 219 for transmission to, or access by, the insertion device 220. The buffer memory device 219 may comprise any suitable memory device, including both volatile and non-volatile memory, as well as a hard disk drive. As noted above, the insertion device 220 then encapsulates the data carousel (or carousels) 300 into, for example, an MPEG-2 transport stream 205 for periodic transmission.

Carousel generator 210 may also include a user interface 216. User interface 216 comprises any suitable device and/or instructions enabling an operator to interact with the carousel generator 210. An input device 213 for receiving commands from an operator may be coupled to the user interface 216, the input device 213 comprising a mouse, keyboard, touch screen, or other suitable device. User interface 216 may be used to select data files (or data files and directory files) to be placed in a module and, further, to select which modules will be placed on a carousel. Also, user interface 216 may enable the operator to prioritize a set of modules—i.e., select the number of instances for each module.

In another embodiment, the user interface 216 allows an operator to select the function and penalty term to be used in assessing the goodness of a module schedule. Thus, the operator can create a plurality of schedules or the same set of modules and subsequently select the most efficient and robust carousel based on a comparison of the goodness metric for each schedule. In addition, the user interface 216 may be employed to optimize the performance of the carousel generator 210 by varying the function and/or penalty term used in determining the goodness measurement and assessing the effect of the selected function and penalty term, respectively, on the outcome of the goodness metric. It should be understood that information such as module priority, the number of instances of a module, and the function and penalty to be used in the goodness metric, or a portion of such information, may be downloaded from data source 218 (or data source 217).

Figure 15:
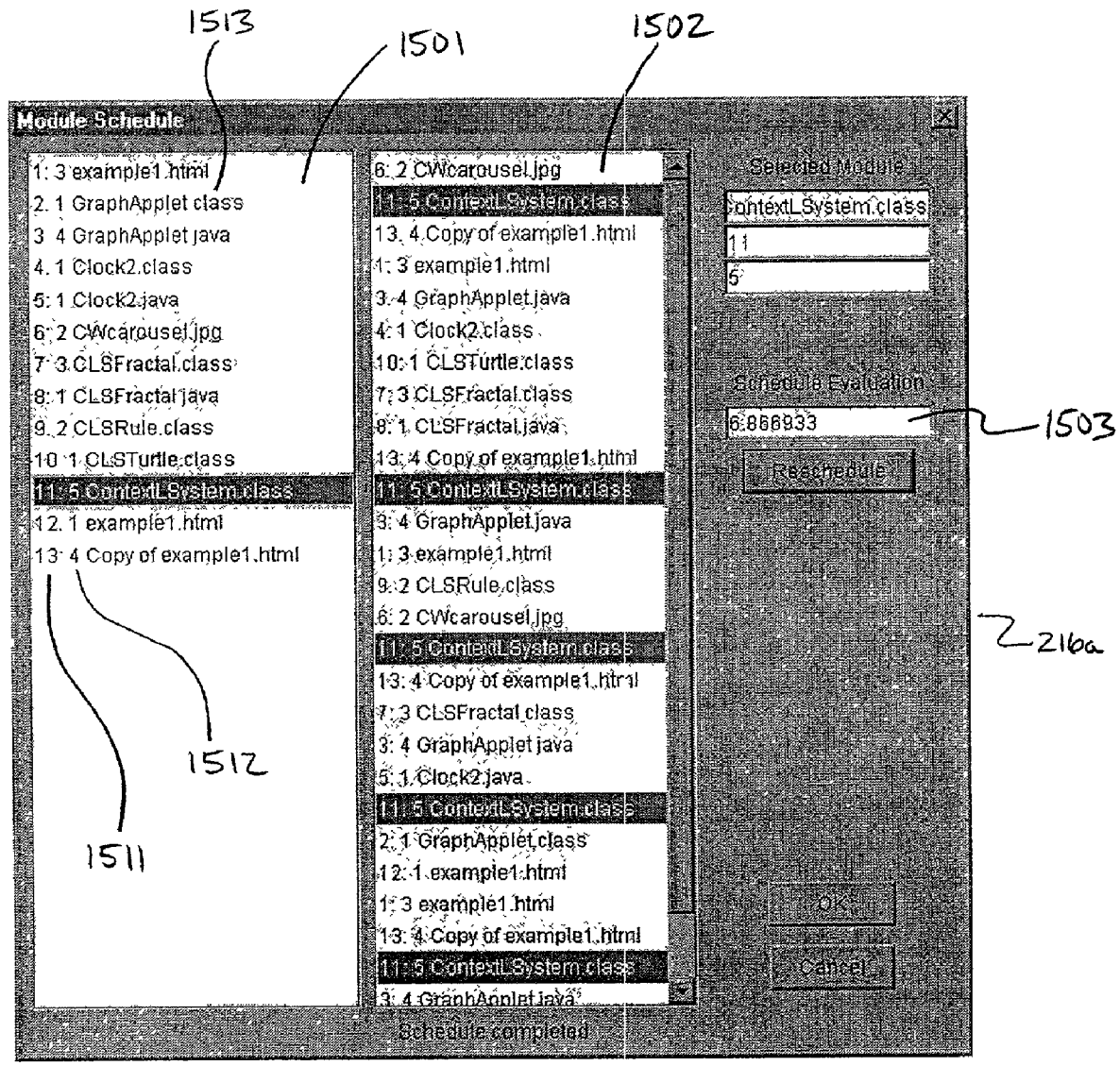
FIG. 15 shows an exemplary embodiment of a graphical user interface of the data carousel generator of FIG. 14.

In yet a further embodiment, the user interface 216 may include a graphical user interface (GUI) 216a. An exemplary embodiment of a GUI 216a is shown in FIG. 15. The GUI 216a may present the user with a list 1501 of all modules to be placed on a carousel, including each module's number 1511, number of instances 1512 in a carousel period, and name or description 1513. The GUI 216a may also show or report the current (or a selected) module schedule 1502 for the carousel, as well as that schedule's measure of goodness 1503. GUI 216a may also display or report a plurality of module schedules 1502 and their associated goodness metric 1503 for comparison. In addition, GUI 216a may display to the operator the function and penalty term used in assessing the goodness of one or more schedules. Further, the GUI 216a may be used to input the operator's selection of a module schedule for a carousel and to commence transmission of the carousel to the buffer 219 and/or insertion device 220.

Embodiments of a carousel having multiple instances of a module, embodiments of a method 600 of scheduling modules onto a carousel, embodiments of a method 900 of measuring the goodness of a modules schedule, and embodiments of a carousel generator 210 having been herein described, those of ordinary skill in the art will appreciate the many advantages thereof, respectively. A data or object carousel having multiple instances of a data or object module provides enhanced tuneability, prioritization, and compensation for transmission errors and/or data corruption. Such a data or object carousel enables the receiving entity to quickly acquire all modules upon tuning to the signal conveying the carousel. The method 600 of scheduling modules in a carousel may provide—by performing multiple iterations—any desired number of module schedules, each module schedule exhibiting efficiency of acquisition and robust transmission. These schedules may then be compared using the method 900 of measuring goodness to determine which of the plurality of proposed schedules is the most efficient and robust. The carousel generator 210 may implement the method 600 of scheduling modules, as well as the method 900 of measuring the goodness of a module schedule, and may also include a user interface 216 enabling an operator to easily create and select a data or object carousel.

A data or object carousel having multiple instances of a data or object module, or multiple instances of two or more modules, as well as the above-described apparatus and methods for scheduling modules on a carousel and measuring the goodness of a module schedule, are generally applicable to all types of communication systems. For example, a carousel having multiple instances of a module may find utility in digital television broadcasting—whether standard definition or high definition—computer networking, and wireless communications, including cellular technologies, Personal Communications Services (PCS) technologies, and Code Division Multiple Access (CDMA) technologies. See, e.g., Telecommunication Industry Association (TIA) IS-136, Rev. B, *Time Division Multiple Access* (TDMA) *Cellular* PCS; and American National Standards Institute (ANSI) J-STD-018, *Recommended Minimum Performance Requirements for* 1.8 to 2.0 GHz Code *Division Multiple Access* (CDMA) *Personal Stations*. Further, although described herein in the context of encapsulating a data or object carousel into an MPEG-2 transport stream, the present invention is applicable to any communication signal and/or system, irrespective of the particular standards or architecture employed.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. An apparatus comprising:
a processing unit to generate a carousel, the carousel including a plurality of modules; and
a graphical user interface coupled with the processing unit to
display a list of the plurality of modules, display a number of instances for each of the plurality of modules, display a module schedule for the plurality of modules, and display a goodness metric for the module schedule, the metric including a sum of interval differences for all of the instances of all of the modules, wherein the interval difference for an instance of one of the modules corresponds to a difference between an actual interval and a desired interval for the instance,
wherein the graphical user interface displays a penalty term and a function of the plurality of modules.

2. The apparatus of claim 1, the graphical user interface to display at least a second module schedule for the plurality of modules.

3. The apparatus of claim 1, the graphical user interface to display a description for each of the plurality of modules.

4. The apparatus of claim 1, further comprising an input device coupled with the graphical user interface to receive commands from a user.

5. A method comprising:
receiving a plurality of modules, at least one module of the plurality of modules comprising one of a data module and an object module;
receiving a designated number of instances for said at least one module, the designated number of instances being at least two;
recieving a function and a penalty term of the plurality of modules;
generating a carousel including the plurality of modules; and
determining a goodness metric for the carousel, the metric including a sum of interval differences for all of the instances of all of the modules, wherein the interval difference for an instance of one of the modules corresponds to a difference between an actual interval and a desired interval for the instance.

6. The method of claim 5, further comprising receiving from a data source the designated number of instances, the function, and the penalty term.

7. The method of claim 5, further comprising receiving from a user interface the designated number of instances, the function, and the penalty term.

8. The method of claim 5, further comprising providing the carousel to a user interface.

9. The method of claim 5, further comprising providing the carousel to an insertion device for encapsulation into a transmission.

10. A method comprising:
displaying to a user a list of a plurality of modules on a carousel;
displaying to the user a number of instances of each module of the plurality of modules;
displaying to the user a penalty term and a function of the plurality of modules;
reporting to the user a first module schedule for the carousel; and
reporting to the user a first goodness metric associated with the first module schedule, the metric including a sum of interval differences for all of the instances of all of the modules, wherein the interval difference for an instance of one of the modules corresponds to a difference between an actual interval and a desired interval for the instance.

11. The method of claim 10, further comprising:
reporting to the user a second module schedule for the carousel; and
reporting to the user a second goodness metric associated with the second module schedule.

12. The method of claim 11, further comprising receiving a module schedule selection from the user, the module schedule selection designating one of the first module schedule and the second module schedule for encapsulation into a transmission.

13. A method comprising:
receiving a plurality of modules for a carousel, at least one module of the plurality of modules comprising one of a data module and an object module;
receiving at least two instances of said at least one module;
generating a first module schedule for the plurality of modules;
receiving a function and a penalty term of the plurality of modules;
determining a goodness metric for the first module schedule, the goodness metric based, at least in part, on the function and the penalty term; and
outputting the first module schedule and the goodness metric to a user interface.

14. The method of claim 13, further comprising outputting the function and the penalty term to the user interface.

15. The method of claim 13, further comprising: generating a second module schedule for the plurality of modules; and outputting the second module schedule to the user interface.

16. The method of claim 15, further comprising providing one of the first module schedule and the second module schedule to an insertion device for encapsulation into a transmission.

17. An article of manufacture comprising:
a computer readable medium encoded with computer executable instructions capable of being executed by a machine in order to cause the machine to
receive a plurality of modules, at least one module of the plurality of modules comprising one of a data module and an object module;
receive a designated number of instances for said at least one module, the designated number of instances being at least two;
receive a function and a penalty term of the plurality of modules;
generate a carousel including the plurality of modules; and determine a goodness metric for the carousel, the metric including a sum of interval differences for all of the instances of all of the modules, wherein the interval difference for an instance of one of the modules corresponds to a difference between an actual interval and a desired interval for the instance.

18. The article of manufacture of claim 17, wherein the instructions, when executed, further cause the machine to receive from a data source the designated number of instances, the function, and the penalty term.

19. The article of manufacture of claim 17, wherein the instructions, when executed, further cause the machine to receive from a user interface the designated number of instances, the function, and the penalty term.

20. The article of manufacture of claim 17, wherein the instructions, when executed, further cause the machine to provide the carousel to a user interface.

21. The article of manufacture of claim 17, wherein the instructions, when executed, further cause the machine to provide the carousel to an insertion device for encapsulation into a transmission.

22. An article of manufacture comprising:
a computer readable medium encoded with computer executable instructions capable of being executed by a machine in order to cause the machine to
display to a user a list of a plurality of modules on a carousel;
display to the user a number of instances of each module of the plurality of modules;
display to the user a penalty term and a function of the plurality of modules;
report to the user a first module schedule for the carousel; and
report to the user a first goodness metric associated with the first module schedule, the metric including a sum of interval differences for all of the instances of all of the modules, wherein the interval difference for an instance of one of the modules corresponds to a difference between an actual interval and a desired interval for the instance.

23. The article of manufacture of claim 22, wherein the instructions, when executed, further cause the machine to:
report to the user a second module schedule for the carousel; and
report to the user a second goodness metric associated with the second module schedule.

24. The article of manufacture of claim 23, wherein the instructions, when executed, further cause the machine to receive a module schedule selection from the user, the module schedule selection designating one of the first module schedule and the second module schedule for encapsulation into a transmission.

25. An article of manufacture comprising:
a computer readable medium encoded with computer executable instructions capable of being executed by a machine in order to cause the machine to
receive a plurality of modules for a carousel, at least one module of the plurality of modules comprising one of a data module and an object module;
receive at least two instances of said at least one module;
generate a first module schedule for the plurality of modules;
receive a function and a penalty term of the plurality of modules;
determine a goodness metric for the first module schedule, the goodness metric based, at least in part, on the function and the penalty term; and
output the first module schedule and the goodness metric to a user interface.

26. The article of manufacture of claim 25, wherein the instructions, when executed, further cause the machine to output the function and the penalty term to the user interface.

27. The article of manufacture of claim 25, wherein the instructions, when executed, further cause the machine to:
generate a second module schedule for the plurality of modules; and
output the second module schedule to the user interface.

28. The article of manufacture of claim 27, wherein the instructions, when executed, further cause the machine to provide one of the first module schedule and the second module schedule to an insertion device for encapsulation into a transmission.

* * * * *